(12) United States Patent
Truong et al.

(10) Patent No.: US 11,334,132 B2
(45) Date of Patent: May 17, 2022

(54) POWER SELECTION FOR PUSB PORTS

(71) Applicant: HEWLETT-PACKARD DEVELOPMENT COMPANY, L.P., Spring, TX (US)

(72) Inventors: Binh T Truong, Houston, TX (US); Mengistu Taye, Houston, TX (US); Javier Enrique Guerrero, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,871

(22) PCT Filed: Apr. 18, 2018

(86) PCT No.: PCT/US2018/028084
§ 371 (c)(1),
(2) Date: Jul. 30, 2019

(87) PCT Pub. No.: WO2019/203814
PCT Pub. Date: Oct. 24, 2019

(65) Prior Publication Data
US 2021/0333854 A1   Oct. 28, 2021

(51) Int. Cl.
*G06F 1/26* (2006.01)
*G06F 13/42* (2006.01)

(52) U.S. Cl.
CPC ......... *G06F 1/266* (2013.01); *G06F 13/4282* (2013.01); *G06F 2213/0042* (2013.01)

(58) Field of Classification Search
CPC ........ G06F 1/266; G06F 1/28; G06F 13/4068; G06F 13/4282; G06F 2213/0042
See application file for complete search history.

(56) References Cited

U.S. PATENT DOCUMENTS 6,624,994 B1   9/2003   Schmoock et al.
9,696,777 B2   7/2017   Pamley et al.
(Continued)

FOREIGN PATENT DOCUMENTS

CN   102820639 A   12/2012
WO   WO-2018013083 A1 * 1/2018 ......... G06F 13/4282

OTHER PUBLICATIONS

"New Docking Stations with USB -Type C Connections". Dell. Online Nov. 16, 2017. Retrieved from Internet Aug. 20, 2021. <https://web.archive.org/web/20171116174443/http://www.dell.com/en-us/work/shop/dell-usb-type-c-docking-stations/ab/dell-usb-type-c-docking-stations>. (Year: 2017).*
(Continued)

*Primary Examiner* — Thomas J. Cleary
(74) *Attorney, Agent, or Firm* — Brooks Cameron & Huebsch PLLC

(57) ABSTRACT

The examples include methods and apparatuses to power a peripheral device through a PUSB port. Powering a peripheral device through a PUSB port includes receiving a request for a plurality of PUSB power options for a PUSB port coupled to a device, providing the plurality of PUSB power options in a hardware initialization system, receiving a selection PUSB power option from the plurality of PUSB power options, and providing a power, corresponding to the selection PUSB power option, to the PUSB port.

15 Claims, 5 Drawing Sheets

(56) References Cited

U.S. PATENT DOCUMENTS

| | | | |
|---|---|---|---|
| 2004/0041021 A1* | 3/2004 | Nugent, Jr. | A47F 9/047 |
| | | | 235/383 |
| 2006/0161793 A1 | 7/2006 | Orr | |
| 2007/0088964 A1* | 4/2007 | Lee | G06F 1/266 |
| | | | 713/300 |
| 2009/0100275 A1* | 4/2009 | Chang | G06F 1/266 |
| | | | 713/300 |
| 2009/0296953 A1* | 12/2009 | Sakata | G10H 1/06 |
| | | | 381/80 |
| 2011/0208980 A1* | 8/2011 | Brooks | G06F 1/266 |
| | | | 713/300 |
| 2014/0359337 A1 | 12/2014 | Tong et al. | |
| 2015/0046727 A1 | 2/2015 | Kobayashi | |
| 2015/0324321 A1 | 11/2015 | Lin | |
| 2017/0295028 A1* | 10/2017 | Pelissier | H04L 12/10 |
| 2017/0300097 A1* | 10/2017 | Staude | G06Q 20/20 |
| 2017/0331270 A1* | 11/2017 | Mattos | G01R 19/165 |
| 2017/0344383 A1* | 11/2017 | Truong | G06F 11/004 |

OTHER PUBLICATIONS

Balachandran, Sasang. "General Purpose Input/Output (GPIO)". Nov. 8, 2009. Michigan State University College of Engineering. (Year: 2009).*

"Retail USB USB PlusPower USB +Power Electro-Mechanical Specification". Version 0.8g. 2005. PoweredUSB.org. (Year: 2005).*

\* cited by examiner

POWER SELECTION FOR PUSB PORTS

BACKGROUND

A computing system can include various electronic components, such as a processor, a memory, an input/output (VO) device, and so forth. A universal serial bus (USB) can couple a device to the computing system.

DETAILED DESCRIPTION

Figure 1:
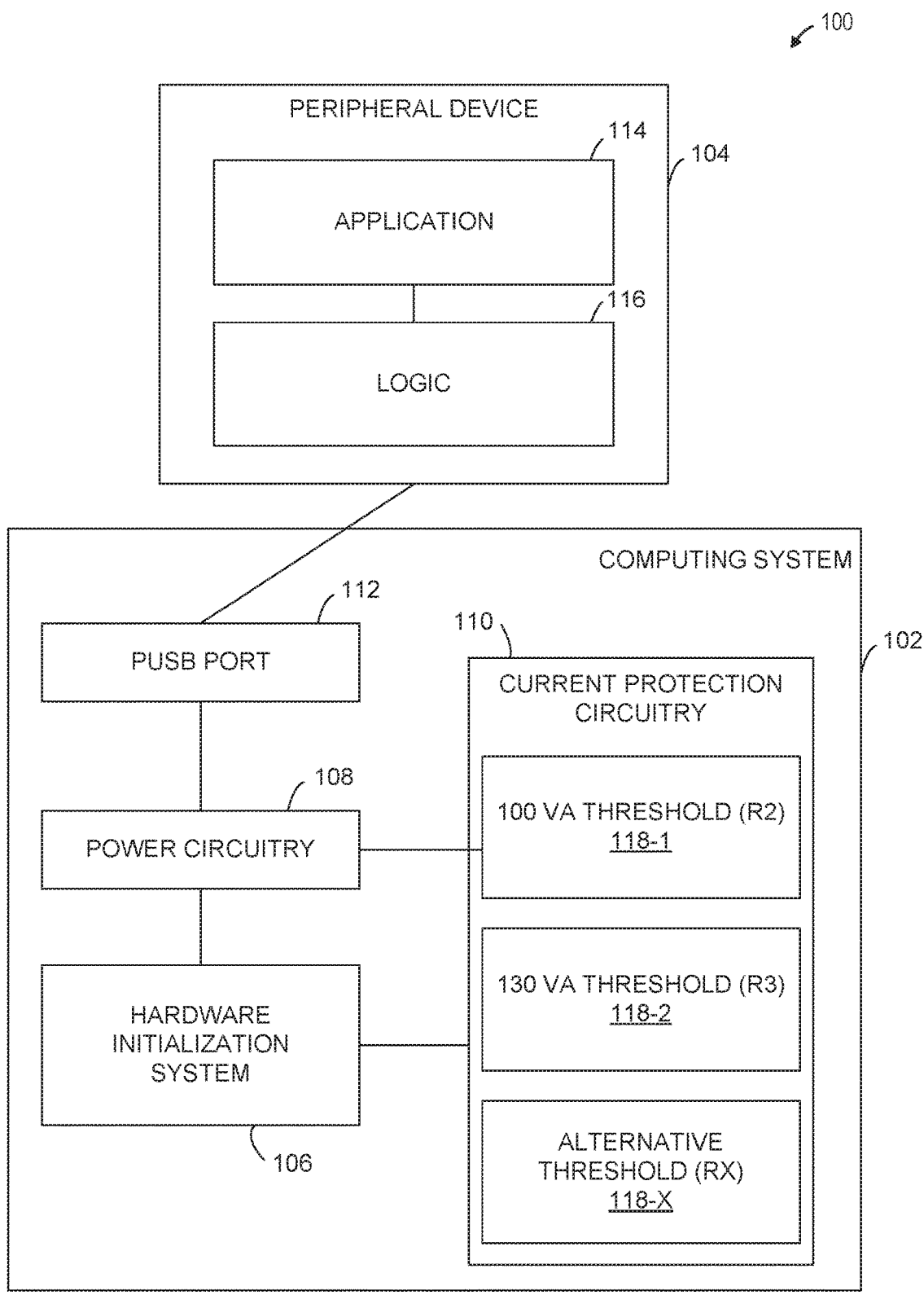
FIG. 1 illustrates an example of a power distribution system for powering a peripheral device through a PUSB port consistent with the disclosure.

In a number of examples, a hardware initialization system can be used to toggle a power provided to a peripheral device through a powered universal serial bus (PUSB) port. The power provided through the PUSB port can range from 100 volt-ampere (VA) to 130 VA. The power provided by the PUSB port can also be greater than 130 VA.

PUSB ports can be coupled to a plurality of different types of peripheral devices to couple the peripheral devices to a system (computing system). Many peripheral devices utilize a separate power adapter to obtain power sufficient to operate at a maximum performance.

Many systems cap a power provided to the peripheral devices through the PUSB port to 100 VA. The cap can be a static cap and may not be adjusted based on the actual needs of the peripheral devices. The 100 VA cap is a safety design to prevent overload of the system if the peripheral devices operate at full capacity. Some peripheral devices can draw power at a maximum power spike of 110 VA to 130 VA, which may violate 24VPUSB specifications. Such peripheral devices may be unable to operate at maximum power given the 100 VA power limitation.

Some systems may not have an over current protection (OCP) limitation and may able to drive the peripheral devices at maximum performance. Such systems risk overloading the system if the peripheral devices enter a malfunction state.

In a number of examples, an OCP limitation can be dynamic to provide for the fluctuation of the peripheral devices. Dynamically providing power to the peripheral devices allows the accommodation of maximum power spikes and allows the peripheral devices to be utilized at maximum power.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated to provide a number of additional examples. In addition, the proportion and the relative scale of the elements provided in the figures are intended to illustrate the examples described, and should not be taken in a limiting sense.

FIG. 1 illustrates an example of a power distribution system 100 for powering a peripheral device 104 through a PUSB port consistent with the disclosure. The power distribution system 100 includes a computing system 102 and the peripheral device 104.

The computing system can include a hardware initialization system 106, a power circuitry 108, a current protection circuitry 110, and a PUSB port 112. The peripheral device 104 includes an application 114 and logic 116 to draw power.

The computing system 102 can be any of a number of different computing systems. For example, the computing system 102 can be a mobile computing system, a server computing system, and/or a desktop computing system, among other types of computing systems. The computing system can comprise memory and processing resources to provide power to the peripheral device 104.

The hardware initialization system 106 can include hardware, firmware, and/or machine-readable instructions to perform hardware initialization during a booting process. A booting process can include, among other examples, a power-on startup. The hardware initialization system 106 can also provide runtime services for operating systems (OSs) and/or applications. The hardware initialization system 106 can test system hardware components and can load a boot loader or an OS. The hardware initialization system 106 can identify devices of the system such as the peripheral device 104.

In some examples, the hardware initialization system 106 can reside in read-only memory (ROM) of the computing system 102. For example, the hardware initializations system 106 can reside in erasable programmable read-only memory (EPROM).

The hardware initialization system 106 can also provide functions after the computing system is booted. The hardware initialization system 106 can be an intermediary between a processing resource and an input/output (IO) device. For example, the hardware initializations system 106 can include details about the peripheral device 104 which allows an OS to interact with the peripheral device 104. Changes to the details about the peripheral device 104 can be accessed and/or provided through the hardware initialization system 106 to the OS and/or other systems such as the power distribution system 100.

In some examples, the hardware initialization system 106 can be a basic input/output system (BIOS) or a unified extensible firmware interface (UEFI). The hardware initialization system 106 can be configured to function within a plurality of different devices such as mobile devices, desktop devices, and/or servers, among other types of devices.

The power circuitry 108 can include hardware, firmware, and/or machine-readable instructions to provide power. The power circuitry 108 can provide power to the hardware initialization system 106, the current protection circuitry 110, the PUSB port 112, and/or the peripheral device 104. The power circuitry 108 can provide different levels of power. For example, the power circuitry 108 can provide 100 VA, 110 VA, 120 VA, 130 VA, or 140 VA, among other levels of power. The power levels described are exemplary and not limiting and as such a plurality of different levels of power can be provided.

The level of power provided to the different components of the computing system 102 can be balanced to ensure that the power drawn from the power circuitry 108 is not greater than a power that can be provided by the power circuitry 108. In that effort, the current protection circuitry 110 can include hardware, firmware, and/or machine-readable instructions to provide a threshold power that can be provided by the power circuitry 108 to a PUSB port 112.

The current protection circuitry 110 can be independent of the power circuitry 108 as shown in FIG. 1. For example, the current protection circuitry 110 can include hardware, firmware, and/or machine-readable instructions that exist independent from the hardware, firmware, and/or machine-readable instructions of the power circuitry 108.

The current protection circuitry 110 can also be incorporated into the power circuitry 108. For example, the current protection circuitry 110 can include hardware, firmware, and/or machine-readable instructions that are part of the hardware, firmware, and/or machine-readable instructions of the power circuitry 108.

Figure 2:
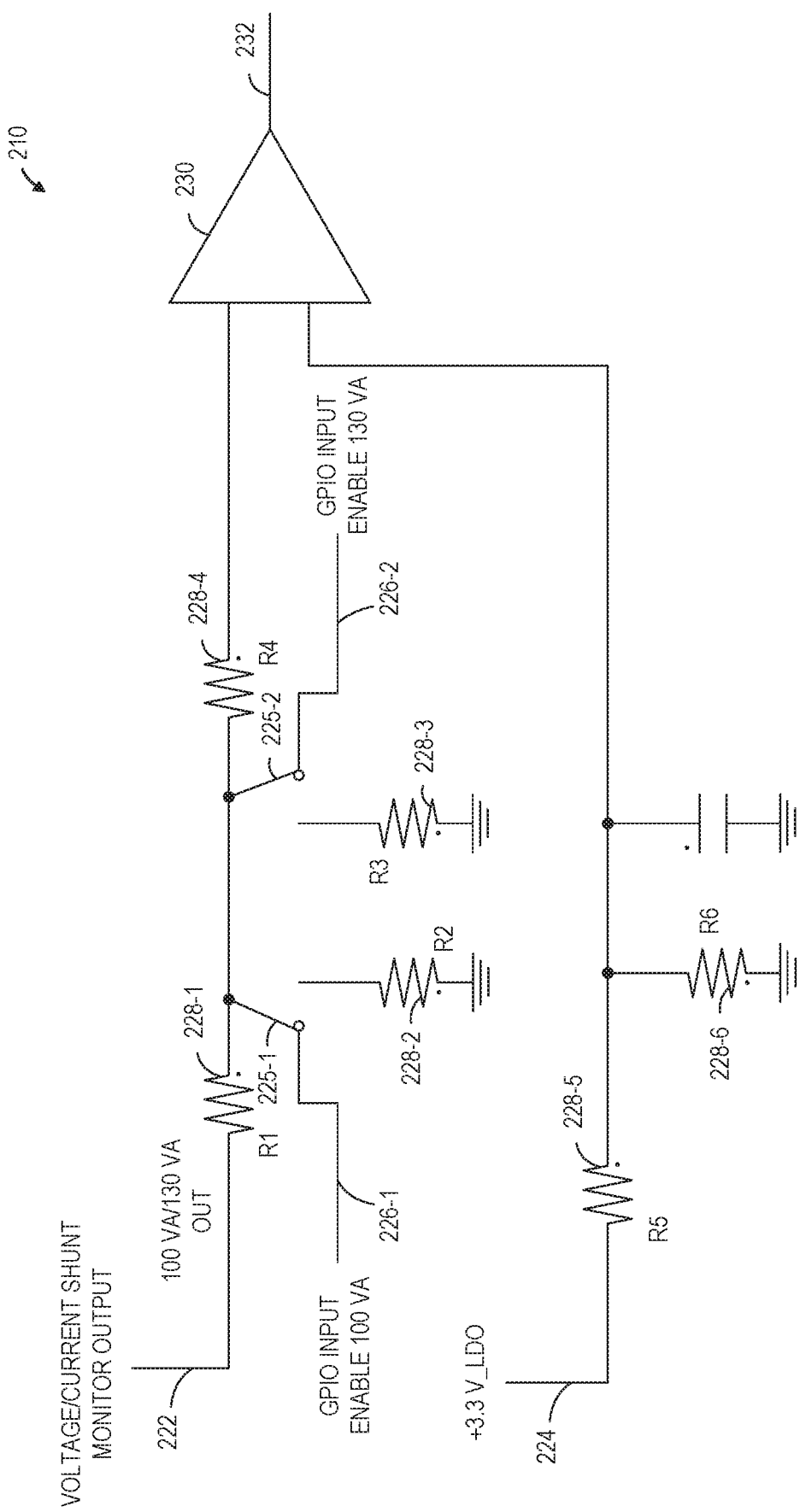
FIG. 2 illustrates an example of a current protection circuitry consistent with the disclosure.

The current protection circuitry 110 can include thresholds 118-1, 118-2, . . . , and 118-X. The thresholds 118-1, 118-2, . . . , and 118-X can be referred to as thresholds 118. The thresholds 118 can be implemented as hardware, firmware, and/or machine-readable instructions. FIG. 2 shows the thresholds 118 in a hardware implementation. The current protection circuitry 110 can provide a positive or a negative signal to the power circuitry 108. The power circuitry 108 can provide power to the PUSB port 112 responsive to receiving a negative signal from the current protection circuitry 110. The power circuitry 108 can cease providing power to the PUSB port 112 responsive to receiving a positive signal from the current protection circuitry 110.

The PUSB port 112 can provide a power received from the power circuitry 108. The PUSB port 112 can provide power to the peripheral device 104 which is coupled to the computing system 102 through the PUSB port 112. The PUSB port 112 can provide a peak power that is higher than a power provided by other USB type ports. As used herein, a peak power includes a maximum power which is provided over a time duration. Providing power through the PUSB port 112 can allow the peripheral device 104 to function without utilizing an independent power supply and/or an external adapter.

The PUSB port 112 can provide data through a first connector and power through a second connector of the PUSB port 112. The PUSB port 112 can provide power at a number of different voltages including 5 volts (V), 12 V, and 24 V, among other voltages. The connectors can operate at up to 6 amps (A).

In some examples, the power provided by the PUSB port 112 can be configured by the hardware initialization system 106. For example, the hardware initialization system 106 can toggle between multiple levels of power and provide a setting/command to the power circuitry 108. Each of the levels of power can be presented as a PUSB power option. The power circuitry 108 can provide power to the PUSB port 112 responsive to receiving the setting/command instruction from the power circuitry 108 to provide a specific level of power. The PUSB port 112 can receive the power corresponding to a power level selected by the hardware initialization system 106 and can provide the selected power.

The peripheral device 104 can be a device that is able to receive power at levels greater than or equal to 100 VA. For example, the peripheral device 104 can be a PUSB device. The peripheral device 104 can function utilizing power received from the PUSB port 112. In some examples, the peripheral device 104 can function without utilizing an independent power supply and/or an external adapter.

In some examples, the peripheral device 104 can be a printer such a thermal printer. A thermal printer can utilize a digital printing process to produce printed images by selectively heating coated paper or thermal paper.

The thermal printer can be, for example, a thermal receipt printer. The thermal receipt printer can be a printer utilized to print receipts. Thermal printers can print large size logo bitmap images that cause the power usage of the peripheral device 104 to increase (e.g., spike). Such increases in power usage can be processed by the logic 116 to draw power greater than 100 VA from the PUSB port 112.

The peripheral device 104 can include hardware, firmware, and/or machine-readable instructions to execute the application 114. The application 114 can provide commands that can utilize power to be executed. As used herein, the commands provided by the application 114 can include commands provided from the application 114 to the logic 116 to cause the logic 116 to perform computations, operations, among other types of commands that can be issued by the application 114. For example, the commands can include read and/or write commands to read and/or write data from a memory resource of the peripheral device 104. The commands can be provided to and/or executed by the logic 116. In some examples, the logic 116 can execute the commands and/or can process the commands to draw power from the computing system 102. The logic 116 can be a number of processors and/or power circuitry of the peripheral device 104, among other types of devices and/or circuitry that can draw power from the computing system 102.

The hardware initialization system 106 can be used to select a power level and/or a maximum power level to supply to the peripheral device 104 through the PUSB port 112. For example, the hardware initialization system 106 can utilize an F10 menu (e.g., BIOS F10 menu) to control the power level provided to the peripheral device 104. The hardware initialization system 106 can also control the levels of power provided to the peripheral device 104 through a menu system that is different from the F10 menu. For example, the F10 menu can provide a number of power level options (e.g., PUSB power options) including two or more power level options. The F10 menu can receive power level selections corresponding to one of the power level options provided to a user, for example. The power level options can include a 100 VA power level option, a 110 VA power level option, a 120 VA power level option, a 130 VA power level option, and/or a 140 VA power level option, among other power level options that can be provided by the hardware initialization system 106. As used herein, a power level option includes a representation of a power level. The power level option can be provided to a user through a display.

A user can select a power level option. The hardware initialization system 106 can store the power level selection and can configure the current protection circuitry 110 and/or the power circuitry 108 based on the power level selection.

The current protection circuitry 110 can, responsive to receiving the power level selections from the hardware initializations system 106, activate a threshold from the thresholds 118. The current protection circuitry 110 can monitor the power used by the computing system 102 and/or the peripheral device 104. Responsive to determining that the power used by the computing system 102 and/or the peripheral device 104 exceeds a threshold, the current protection circuitry 110 can cut off power to the peripheral device 104. The computing system 102 can cut off power to the peripheral device 104 by requesting that the power circuitry 108 cease providing power to the peripheral device 104 and/or by requesting that the power circuitry 108 throttle the power provided to the peripheral device 104. As used herein, a request includes a signal representing a message instruction the processing of a command and/or operation.

The power circuitry 108 can throttle the power provided to the peripheral device 104 by providing less power than level of power requested by the peripheral device 104 and/or by providing less power than the level of power selected through the hardware initialization system 106. The hardware initialization system 106 can also provide the power level selection to the power circuitry 108. The power circuitry 108 can limit the power provided to the peripheral device 104 based on the power level selection. For example, the power circuitry 108 can provide a minimum power and/or a maximum power equal to the power level selection. As used herein, a selection includes an indication of an acceptance of a power level option.

FIG. 2 illustrates an example of a current protection circuitry 210 consistent with the disclosure. The current protection circuitry 210 can be analogous to the current protection circuitry 110 in FIG. 1.

The current protection circuitry 210 can include line 222 to provide a monitor voltage and a line 224 to provide a reference voltage. The current protection circuitry 210 also includes general purpose input/output (GPIO) line 226-1 (e.g., GPIO input enable 100 VA) and a GPIO line 226-2 (e.g., GPIO line enable 130 VA).

The current protection circuitry 210 includes resistors 228-1, 228-2, 228-3, 228-4, 228-5, and 228-6 (e.g., R1, R2, R3, R4, R5, and R6). The current protection circuitry 210 includes a comparator 230 and line 232.

The current protection circuitry 210 can be coupled to a voltage/current shunt monitor (not shown). The voltage/current shunt monitor can be part of the current protection circuitry 210 or can be independent of the current protection circuitry 210. The voltage/current shunt monitor can provide a monitor voltage to the current protection circuitry 210 through the line 222.

The voltage/current shunt monitor can provide a voltage corresponding to the PUSB port 112 or the computing system 102, in FIG. 1. That is, the voltage/current shunt monitor can provide a voltage that represents a power provided by the PUSB port 112 and/or the computing system 102. For example, as the power provided by the PUSB port 112 increases, the monitor voltage provided by the voltage/current shunt monitor increases. The voltage provided by the line 222 can change over time responsive to a change of the power provided by the PUSB port 112 or the power used and/or provided by the computing system 102.

Said differently, the voltage/current shunt monitor can monitor the power provided by the PUSB port and/or the power used by the computing system and can provide a voltage based on the monitoring. The monitoring voltage can represent a level of power used by the PUSB port and/or the computing system. The monitor voltage can be divided using switches 225-1 and 225-2, resistors 228-1, 228-2, and 228-3, and GPIO lines 226-1 and 226-2.

The GPIO lines 226-1 and 226-2 can be controlled and/or activated by the hardware initialization system. Although FIG. 2 shows two GPIO lines (e.g., the GPIO lines 226-1 and 226-2) and two switches (e.g., the switches 225-1 and 225-2) other examples can provide for more than two GPIO lines and switches.

The GPIO line 226-1 can be activated to activate the switch 225-1. The GPIO line 226-2 can be activated to activate the switch 226-2. The GPIO lines 226-1 and 226-2 can be referred to as GPIO lines 226. Activating the GPIO line 226-1 can include providing a predefined voltage through the GPIO line 226-1. In some examples, the GPIO lines 226 may provide no voltage until the GPIO lines 226 are activated. The GPIO lines 226 may also provide a default voltage until the GOIO lines 226 are activated.

The GPIO lines 226 can be coupled to the switches 225-1 and 225-2 to control the switches. The switches 225-1 and 225-2 can be referred to as switches 225. For example, the GPIO line 226-1 can control the switch 225-1 and the GPIO line 226-2 can control the switch 225-1. Activating a GPIO line can include activating a switch. For example, activating the GPIO line 226-1 can activate the switch 225-1 and activating the GPIO line 226-2 can activate the switch 225-2.

FIG. 2 shows the switches 225-1 and 225-2 in an inactive state. That is, the switches 225 do not connect the resistor 228-2 or the resistor 228-3 to the line 222. Activating the switch 225-1 can couple the resistor 228-2 to the line 222. Activating the switch 225-2 can couple the resistor 228-3 to the line 222. In some examples, only a single one of the switches 225 can be activated at a time.

Coupling the resistor 228-2 can divide the monitor voltage to correspond to 100 VA. That is, the monitor voltage can be scaled to a voltage corresponding to 100 VA using the resistor 228-2. Coupling the resistor 228-3 can divide the monitor voltage to correspond to 130 VA. That is, the monitor voltage can be scaled to a voltage corresponding to 130 VA. Dividing the monitor voltage can provide for a voltage that can be compared to the reference voltage provided through line 224. Each of the resistors 228-2, 228-3, and 228-6 are coupled to ground.

The hardware initialization system can toggle a threshold by activating the switches 225-1 and 225-2. The hardware initialization system can toggle a power provided through the PUSB via the power circuitry. In some examples, the GPIO line 226-1, the switch 225-1, and/or the resistor 228-1 can activate the threshold 118-1 while the GPIO line 226-2, the switch 225-2, and/or the resistor 228-2 can activate the threshold 118-2 in FIG. 1. In other examples, additional GPIO lines, switches, and/or resistors can activate additional thresholds (e.g., the threshold 118-X).

The line 224 can provide a reference voltage. The reference voltage can, for example, provide 3.3 V. The reference voltage can be a low-dropout (LDO) voltage that can be used to regulate a voltage even when the supply voltage (e.g., reference voltage) is very close to the output voltage (e.g., monitor voltage). The 3.3 V can be divided using the resistor 228-5 and/or the resistor 228-6. The resistor 228-6 can be coupled to the line 224 and ground. The line 224 can also be coupled to a capacitor.

The reference voltage and the monitor voltage can be received at the comparator 230. The comparator 230 can compare the monitor voltage to the reference voltage. For example, the comparator 230 can determine whether the monitor voltage is less than the reference voltage. If the monitor voltage is less than the reference voltage, then the comparator 230 can provide a negative voltage through line 232. If the monitor voltage is greater than or equal to the reference voltage, then the comparator 230 can provide a positive voltage through line 232.

A determination that the monitor voltage is less than the reference voltage can indicate that the power provided through the PUSB and/or the computing system is within a threshold corresponding to the power selected using the hardware initialization system. If the monitor voltage is determined to be equal to or greater than the reference voltage, then the power provided through the PUSB and/or the computing system is greater than the threshold corresponding to the power selected using the hardware initialization system. Providing a power that is greater than the threshold selected can endanger the computing system and/or the peripheral device.

A positive signal provided through the line 232 can activate a circuitry to cease providing power to the peripheral device. A negative signal provided through the line 232 can prevent the activation of a circuitry to cease providing power to the peripheral device such that power continues to be provided to the peripheral device.

Figure 3:
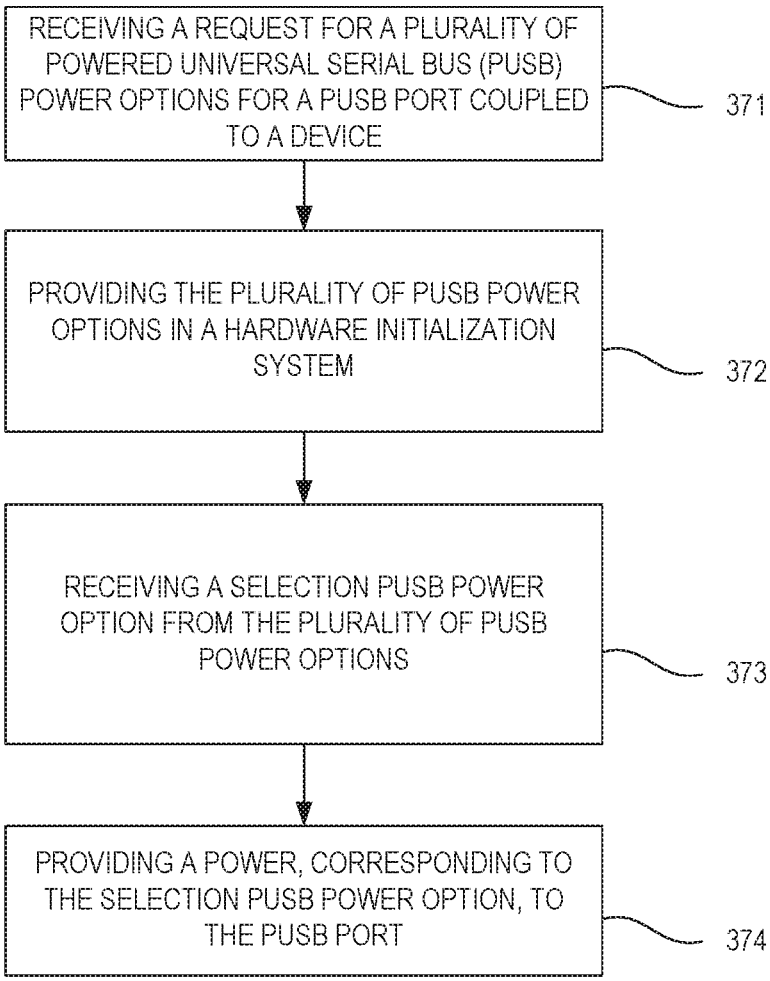
FIG. 3 illustrates an example flow diagram of a method for powering a peripheral device through a PUSB port consistent with the disclosure.

FIG. 3 illustrates an example flow diagram of a method 370 for powering a peripheral device through a PUSB port consistent with the disclosure. At block 371, the method 370 includes receiving a request for a plurality of PUSB power options for a PUSB port coupled to a device. At block 372, the method 370 includes providing the plurality of PUSB power options in a hardware initialization system. At block 373, the method 370 includes receiving a selection PUSB power option from the plurality of PUSB power options. At block 374, the method 370 includes providing power, corresponding to the selection PUSB power option, to the PUSB port.

In some examples, the selected PUSB power option can be a 100 VA power option. The 100 VA power option can be a default power option for the PUSB port. 110 VA can be provided to the PUSB port where the 110 VA corresponds to the 100 VA power option.

In other examples, the selected PUSB power option can be a 130 VA power option. 130 VA can be provided to the PUSB port where the 130 VA corresponds to the 130 VA power option.

The device can be a receipt printer. The hardware initialization system can be a BIOS.

Figure 4:
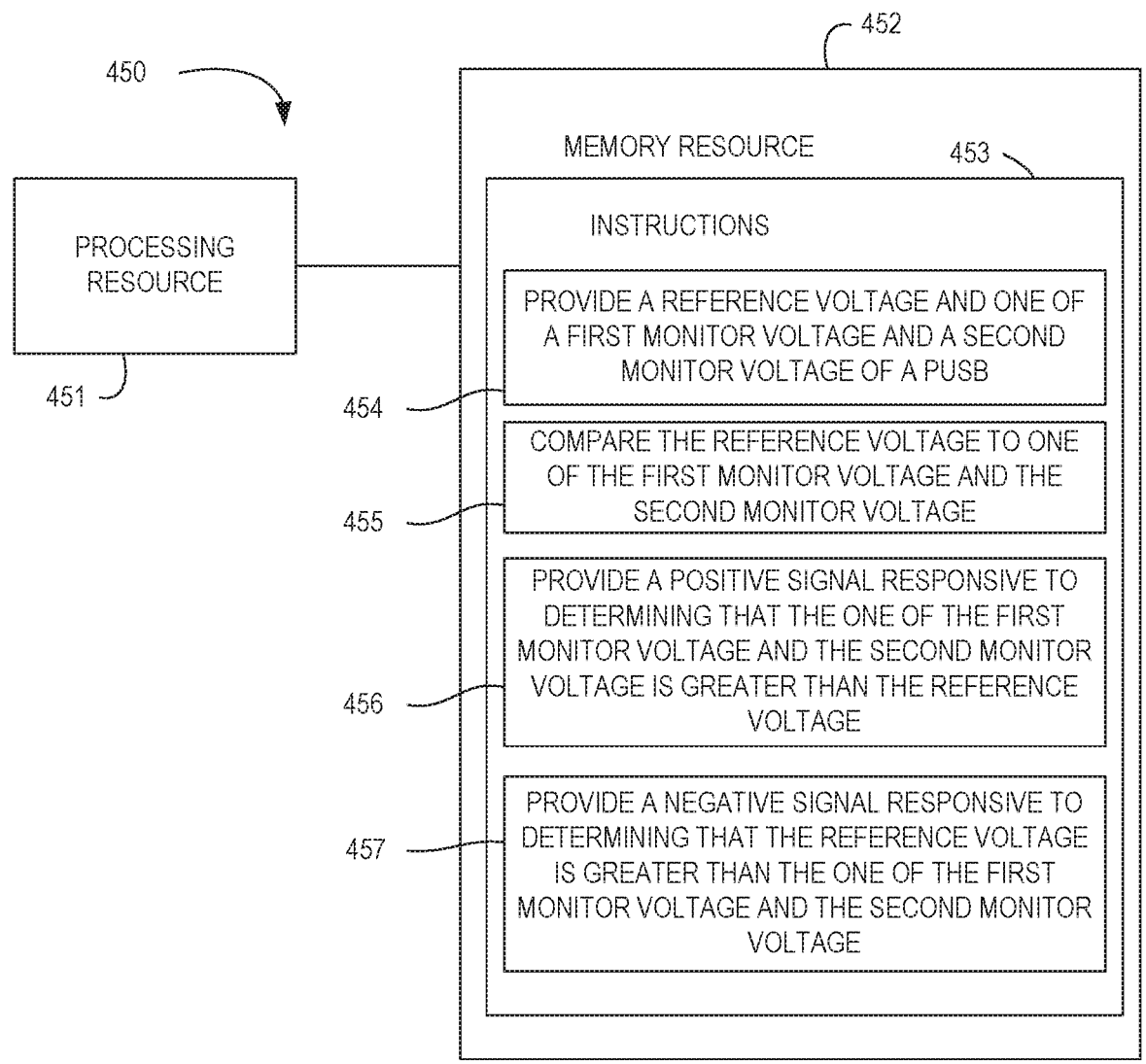
FIG. 4 illustrates an example of an apparatus for powering a peripheral device through a PUSB port consistent with the disclosure.

FIG. 4 illustrates an example of an apparatus 450 for powering a peripheral device through a PUSB port consistent with the disclosure. As shown in FIG. 4, the apparatus 450 includes a processing resource 451 and a memory resource 452.

The processing resource 451 may be a hardware processing unit such as a microprocessor, application specific instruction set processor, coprocessor, network processor, or similar hardware circuitry that can cause machine-readable instructions to be executed. In some examples, the processing resource 451 may be a plurality of hardware processing units that can cause machine-readable instructions to be executed. The processing resource 451 can include central processing units (CPUs) and/or graphics processing units (GPUs), among other types of processing units. The memory resource 452 may be any type of volatile or non-volatile memory or storage, such as random access memory (RAM), flash memory, read-only memory (ROM), storage volumes, a hard disk, or a combination thereof.

The memory resource 452 may store instructions 453 thereon. When executed by the processing resource 451, the instructions 453 may cause the apparatus 450 to perform specific tasks and/or functions. For example, at block 454, the memory resource 452 may store instructions 453 which may be executed by the processing resource 451 to cause the apparatus 450 to provide a reference voltage and one of a first monitor voltage and a second monitor voltage of a PUSB. At block 455, the memory resource 452 may store instructions 453 which may be executed by the processing resource 451 to cause the apparatus 450 to compare the reference voltage to one of the first monitor voltage and the second monitor voltage. At block 456, the memory resource 452 may store instructions 453 which may be executed by the processing resource 451 to cause the apparatus 450 to provide a positive signal responsive to determining that one of the first monitor voltage and the second monitor voltage is greater than the reference voltage. At block 457, the memory resource 452 may store instructions 453 which may be executed by the processing resource 451 to cause the apparatus 450 to provide a negative signal responsive to determining that the reference voltage is greater than the one of the first monitor voltage and the second monitor voltage.

The second line can be toggled using a first GPIO line and a first resistor to divide the first monitor voltage to correspond with a first power provided via the PUSB port. The second line is toggled using a second GPIO line and a second resistor to divide the second monitor voltage to correspond with a second power provided via the PUSB port. The second line can be further toggled using a first switch to selectively couple the first GPIO line or the first resistor to a first switch to selectively couple the first resistor to the second line, wherein the first GPIO line controls the first switch. The second line can also be toggled using a second switch to selectively couple the second resistor to the second line, wherein the second GPIO line controls the second switch.

The first GPIO line and the second GPIO line are controlled by the BIOS. That is, the activation of the first GPIO line and the activation of the second GPIO line can be controlled by the BIOS. Accordingly, the BIOS can also control the first switch and the second switch.

In some examples, the first monitor voltage can correspond to 100 VA which can be provided by the PUSB. The second monitor voltage can correspond to a power that is greater than 100 VA which can be provided by the PUSB.

Figure 5:
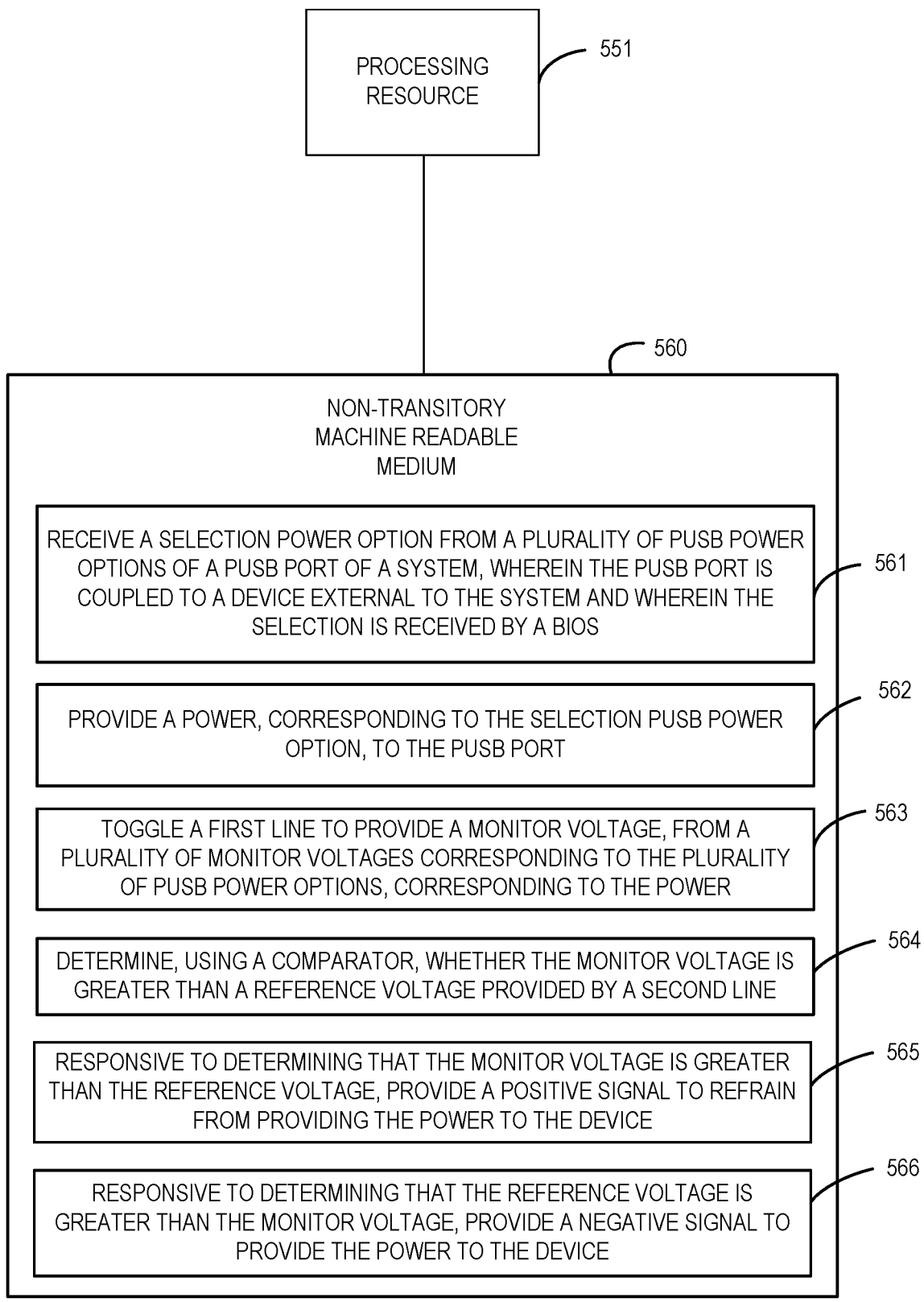
FIG. 5 illustrates an example non-transitory machine-readable medium for powering a peripheral device through a PUSB port consistent with the disclosure.

FIG. 5 illustrates an example non-transitory machine-readable medium 560 for powering a peripheral device through a PUSB port consistent with the disclosure. A processing resource 551 may execute instructions stored on the non-transitory machine readable medium 560. The non-transitory machine readable medium 560 may be any type of volatile or non-volatile memory or storage, such as random access memory (RAM), flash memory, read-only memory (ROM), storage volumes, a hard disk, or a combination thereof.

The example medium 560 stores instructions 561 executable by a processing resource 551 to receive a selection PUSB power option from a plurality of PUSB power options of a PUSB port of a system, wherein the PUSB port is coupled to a device external to the system and wherein the selection is received by a BIOS. The example medium 560 stores instructions 562 executable by a processing resource 551 to provide a power, corresponding to the selection PUSB power option, to the PUSB port. The example medium 560 stores instructions 563 executable by the processing resource 551 toggle a first line to provide a monitor voltage, from a plurality of monitor voltages corresponding to the plurality of PUSB power options, corresponding to the power. The example medium 560 stores instructions 564 executable by the processing resource 551 to determine, using a comparator, whether the monitor voltage is greater than a reference voltage provided by a second line. The example medium 560 stores instructions 565 executable by the processing resource 551 to responsive to determining that the monitor voltage is greater than the reference voltage, provide a positive signal to refrain from providing the power to the device. The example medium 560 stores instructions 566 executable by the processing resource 551 to, responsive to determining that the reference voltage is greater than the monitor voltage, provide a negative signal to provide the power to the device.

In some examples, the instruction to toggle the monitor voltage can also include instructions to toggle the monitor voltage provided by the first line using a plurality of switches, a plurality of GPIO lines, and a plurality of resistors. The BIOS can control the plurality of switches by activating the plurality of GPIO lines. Each pair of the plurality of GPIO lines and the plurality of resistors can correspond to a different power from a plurality of powers provide by the PUSB, wherein the plurality of powers includes the power.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A method comprising:
receiving a request for a plurality of powered universal serial bus (PUSB) power options for a PUSB port coupled to a device;
providing the plurality of PUSB power options in a hardware initialization system, wherein:
the plurality of PUSB power options include power options that exceed a PUSB port power cap specification; and
the plurality of PUSB power options only include power options that are greater than or equal to 100 VA;
receiving a selected PUSB power option from the plurality of PUSB power options; and
providing a power, corresponding to the selected PUSB power option, to the PUSB port that exceeds the PUSB port power cap specification.

2. The method of claim 1, wherein receiving the selected PUSB power option further comprises receiving a 100 VA power option.

3. The method of claim 2, wherein the 100 VA power option is a default power option for the PUSB port.

4. The method of claim 1, wherein receiving the selected PUSB power option further comprises receiving the selected PUSB power option corresponding to a power that is greater than 100 VA.

5. The method of claim 4, wherein the selected PUSB power option is a 130 VA power option and wherein providing the power further comprises providing 130 VA to the PUSB port.

6. The method of claim 1, wherein:
the device is a receipt printer; and
the hardware initialization system is a basic input/output system (BIOS).

7. An apparatus comprising:
a first line with a reference voltage;
a second line toggled by a basic input\output system (BIOS) between a first monitor voltage and a second monitor voltage of a powered universal serial bus (PUSB), wherein:
the first monitor voltage and the second monitor voltage provide a plurality of PUSB power options that exceed a PUSB port power cap specification; and
the plurality of PUSB power options only include power options that are greater than or equal to 100 VA; and
a comparator to:
compare the reference voltage to one of the first monitor voltage and the second monitor voltage;
provide a positive signal responsive to determining that the one of the first monitor voltage and the second monitor voltage is greater than the reference voltage; and
provide a negative signal responsive to determining that the reference voltage is greater than the one of the first monitor voltage and the second monitor voltage.

8. The apparatus of claim 7, wherein the second line is toggled using a first general purpose input/output (GPIO) line and a first resistor to divide the first monitor voltage to correspond with a first power provided via the PUSB port.

9. The apparatus of claim 8, wherein the second line is toggled using a second general purpose input/output (GPIO) line and a second resistor to divide the second monitor voltage to correspond with a second power provided via the PUSB port.

10. The apparatus of claim 9, wherein the second line is further toggled using:
a first switch to selectively couple the first resistor to the second line, wherein the first GPIO line controls the first switch;
a second switch to selectively couple the second resistor to the second line, wherein the second GPIO line controls the second switch; and
wherein the first GPIO line and the second GPIO line are controlled by the BIOS.

11. The apparatus of claim 7, wherein the first monitor voltage corresponds to a power greater than 100 VA provided by the PUSB port and the second monitor voltage corresponds to a power provided by the PUSB port that is greater than first monitor voltage.

12. A non-transitory machine-readable medium storing instructions executable by a processing resource to:
receive a selected powered universal serial bus (PUSB) power option from a plurality of PUSB power options of a PUSB port of a system that include power options that exceed a PUSB port power cap specification, wherein:
the plurality of PUSB power options only include power options that are greater than or equal to 100 VA;
the selected power option is a power option that exceeds the PUSB power port cap specification;
the PUSB port is coupled to a device external to the system; and
the selected PUSB power option is received by a basic input/output system (BIOS);
provide a power, corresponding to the selected PUSB power option, to the PUSB port that exceeds the PUSB port power cap specification;

toggle a first line to provide a monitor voltage, from a plurality of monitor voltages corresponding to the plurality of PUSB power options, corresponding to the power;

determine, using a comparator, whether the monitor voltage is greater than a reference voltage provided by a second line;

responsive to determining that the monitor voltage is greater than the reference voltage, provide a positive signal to refrain from providing the power to the device; and responsive to determining that the reference voltage is greater than the monitor voltage, provide a negative signal to provide the power to the device.

13. The non-transitory machine readable medium of claim 12, wherein the instructions executable to toggle the first line further include instructions to toggle the monitor voltage provided by the first line using a plurality of switches, a plurality of general purpose input/output (GPIO) lines, and a plurality of resistors.

14. The non-transitory machine readable medium of claim 13, wherein each pair of the plurality of GPIO lines and the plurality of resistors corresponds to a different power from a plurality of powers provided by the PUSB port, wherein the plurality of powers includes the power.

15. The non-transitory machine readable medium of claim 14, wherein a first pair of the plurality of GPIO lines and the plurality of resistors provide a power greater than 100 VA and a second pair of the plurality of GPIO lines and the plurality of resistors provide a power greater than the first pair of GPIO lines and resistors.

* * * * *